(12) United States Patent
Simsek

(10) Patent No.: US 10,455,625 B2
(45) Date of Patent: Oct. 22, 2019

(54) CONFIGURATION OF CONNECTIVITY BEFORE GETTING INTO A VEHICLE

(71) Applicant: VOLKSWAGEN AG, Wolfsburg (DE)

(72) Inventor: Burak Simsek, Braunschweig (DE)

(73) Assignee: Volkswagen AG (DE)

( * ) Notice: Subject to any disclaimer, the term of this patent is extended or adjusted under 35 U.S.C. 154(b) by 69 days.

(21) Appl. No.: 15/284,566

(22) Filed: Oct. 4, 2016

(65) Prior Publication Data

US 2017/0105235 A1    Apr. 13, 2017

(30) Foreign Application Priority Data

Oct. 7, 2015    (DE) .................. 10 2015 219 365

(51) Int. Cl.
| | |
|---|---|
| *H04W 76/10* | (2018.01) |
| *H04W 4/48* | (2018.01) |
| *B60R 25/24* | (2013.01) |
| *B60R 25/25* | (2013.01) |
| *H04W 12/06* | (2009.01) |
| *H04W 12/08* | (2009.01) |
| *H04W 4/04* | (2009.01) |
| *H04W 4/80* | (2018.01) |
| *H04W 76/14* | (2018.01) |

(52) U.S. Cl.
CPC ............ *H04W 76/10* (2018.02); *B60R 25/24* (2013.01); *B60R 25/25* (2013.01); *H04W 4/046* (2013.01); *H04W 4/48* (2018.02); *H04W 4/80* (2018.02); *H04W 12/06* (2013.01); *H04W 12/08* (2013.01); *H04W 76/14* (2018.02)

(58) Field of Classification Search
CPC ..... H04W 76/02; H04W 12/06; H04W 12/08; H04W 76/10; H04W 4/48; H04W 4/80; H04W 4/046; H04W 76/14; B60R 25/01; B60R 25/24; B60R 25/25; B60R 2325/105; B60R 2325/205; H04L 41/0806
See application file for complete search history.

(56) References Cited

U.S. PATENT DOCUMENTS

| | | | | |
|---|---|---|---|---|
| 9,197,413 | B1* | 11/2015 | Hall, III | ............... H04W 12/06 |
| 9,762,444 | B1* | 9/2017 | Kim | .................... H04L 41/0866 |
| 2006/0015221 | A1* | 1/2006 | Sarkar | .................. B60N 2/0248 |
| | | | | 701/2 |
| 2008/0258868 | A1* | 10/2008 | Nakajima | ............... B60R 25/24 |
| | | | | 340/5.72 |

(Continued)

FOREIGN PATENT DOCUMENTS

| | | |
|---|---|---|
| DE | 102008017946 A1 | 11/2009 |
| DE | 102010055375 A1 | 8/2011 |

(Continued)

OTHER PUBLICATIONS

Search Report from German Patent Application No. 10 2015 219 365.9; dated Jun. 10, 2016.

*Primary Examiner* — Amancio Gonzalez
(74) *Attorney, Agent, or Firm* — Barnes & Thornburg LLP

(57) ABSTRACT

The configuration of a wireless communication link between a mobile device and a vehicle including authentication of the mobile device, automatic adjustment of a configuration of the mobile device for the wireless communication link on the basis of the authentication, and automatic adjustment of a configuration of the vehicle.

19 Claims, 1 Drawing Sheet

(56) References Cited

U.S. PATENT DOCUMENTS

| | | | |
|---|---|---|---|
| 2011/0250842 A1* | 10/2011 | Stafford | H04W 24/02 455/41.2 |
| 2012/0252405 A1 | 10/2012 | Lortz et al. | |
| 2014/0270172 A1* | 9/2014 | Peirce | H04W 12/04 380/270 |
| 2015/0024688 A1* | 1/2015 | Hrabak | H04W 4/008 455/41.2 |
| 2015/0116100 A1* | 4/2015 | Yang | B60R 25/102 340/426.19 |
| 2015/0148989 A1 | 5/2015 | Cooper et al. | |
| 2015/0161836 A1* | 6/2015 | Park | B60R 25/2045 340/5.51 |
| 2015/0296441 A1* | 10/2015 | Elnajjar | H04W 4/80 370/312 |
| 2016/0013934 A1* | 1/2016 | Smereka | H04W 4/001 713/171 |
| 2016/0203661 A1* | 7/2016 | Pudar | B60R 25/24 340/5.25 |
| 2016/0225211 A1* | 8/2016 | Gehin | H04L 67/12 |
| 2016/0277923 A1* | 9/2016 | Steffey | H04W 12/04 |
| 2017/0096123 A1* | 4/2017 | Gennermann | B60R 25/241 |

FOREIGN PATENT DOCUMENTS

| | | |
|---|---|---|
| DE | 102012012565 A1 | 12/2013 |
| DE | 102013110594 A1 | 5/2014 |
| EP | 2793491 A1 | 10/2014 |
| WO | 2015091951 A1 | 6/2015 |

\* cited by examiner

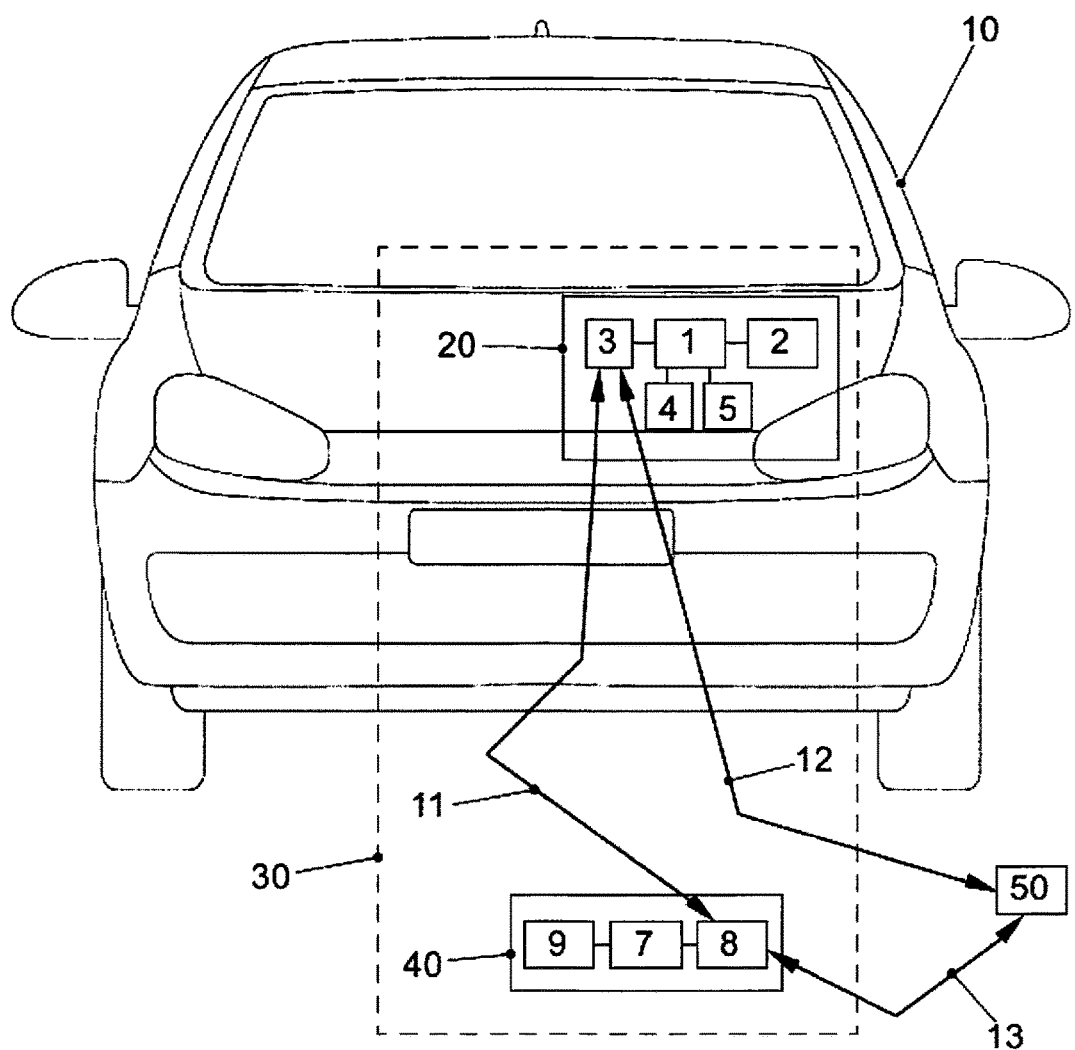

CONFIGURATION OF CONNECTIVITY BEFORE GETTING INTO A VEHICLE

PRIORITY CLAIM

This patent application claims priority to German Patent Application No. 10 2015 219 365.9, filed 7 Oct. 2015, the disclosure of which is incorporated herein by reference in its entirety.

SUMMARY

Illustrative embodiments relate to the automatic setup of a wireless communication link between a mobile device and a vehicle.

BRIEF DESCRIPTION OF THE DRAWINGS

The disclosed embodiments are described below with reference to the single FIGURE.

FIG. 1 schematically shows a disclosed vehicle and a disclosed mobile device.

DETAILED DESCRIPTION

DE 10 2012 012 565 A1 relates to a method for entering identification data for a vehicle into a user database of a server device. To couple a communication device to the vehicle, this involve particular information (e.g., BT-MAC address, WLAN station identifier), such as a QR code, being transmitted from the vehicle to the communication device, which means that a manual operation by the user of the communication device is required to capture the QR code.

US 2015/0148989 A1 relates to a method to operate a mobile device to control a vehicle, and does not describe the setup of a communication link between a mobile device and a vehicle.

DE 10 2008 017 946 B4 relates to a method to interchange data between a fixed data processing unit and a vehicle, and does not describe the setup of a communication link between a mobile device and a vehicle.

When getting into his vehicle, the average driver wants his mobile device (smartphone, laptop, tablet, etc.) to be connected to his vehicle for communication purposes. At least if it is a mobile device that has never yet been connected to the vehicle for communication purposes, this requires complicated inputs by the user to set up a wireless communication link between the mobile device and the vehicle. Frequently, in all cases (that is to say, even if the mobile device has already been coupled to the vehicle for communication purposes), the prior art requires manual inputs by the driver or the owner of the mobile device to set up the desired wireless communication link between the mobile device and the vehicle.

Therefore, the disclosed embodiments simplify the setup of a (particularly, first or initial) mobile communication link between a mobile device and a vehicle.

The disclosed embodiments provide a method for setting up a wireless communication link between a mobile device and a vehicle, by a vehicle and by a mobile device.

The disclosed embodiments provide a method for setting up a wireless communication link between a mobile device and a vehicle. In this case, the disclosed method comprises the following operations:

authentication of the mobile device. This operation involves the vehicle being informed that an authorized mobile device wishes to set up the communication link, and which mobile device it is, and/or the authorized mobile device being informed of the vehicle to which the communication link needs to be set up.

automatic adjustment of a configuration for the wireless communication link by the mobile device on the basis of the authentication. Only if the mobile device has been authenticated beforehand (i.e., it is certain that it is a mobile device that is authorized for the vehicle) is the mobile device automatically configured, using an application running in the mobile device, for the wireless communication link to the vehicle. This requires no manual activity (e.g., by the driver or the owner of the mobile device).

automatic adjustment of a configuration for the wireless communication link by the vehicle on the basis of the authentication. Only if the mobile device has been authenticated beforehand (i.e., it is certain that it is a mobile device that is authorized for the vehicle) is the vehicle automatically configured for the wireless communication link to this mobile device. This also requires no manual activity (e.g., by the driver or the owner of the mobile device).

The wireless communication link may be a WLAN link, a Bluetooth link or a near field communication link, for example. The adjustment of the configuration therefore comprises WLAN tethering, Bluetooth configurations and/or NFC configurations, for example.

By virtue of configuration of the mobile device and configuration of the vehicle being performed automatically (i.e., without manual activities), setup of the wireless communication link between the mobile device and the vehicle is simplified. This applies to setup of an initial or first wireless communication link between the mobile device and the vehicle (i.e., in the event of there never yet having previously been a wireless communication link between the mobile device and the vehicle). The disclosed embodiments allow the wireless communication link between the mobile device and the vehicle to be set up automatically before actually getting into the vehicle. The inventive setup of the wireless communication link requires no reception of a Bluetooth signal, the WLAN signal or NFC signal by the vehicle or mobile device, as in the case according to the prior art when a wireless communication link of a particular type (e.g., WLAN, Bluetooth, NFC) is set up between two communication partners if there has already previously been a wireless communication link of the same type between these communication partners.

The disclosed embodiment allow the connection settings or configuration settings for setting up the wireless communication link between vehicle and mobile device to be made automatically without this requiring an NFC link, for example.

The automatic adjustment of the configuration of the mobile device and/or the automatic adjustment of the configuration of the vehicle is/are performed on the basis of configuration data in each case. These configuration data can also contain a piece of information concerning what type of wireless communication link is actually intended to be engaged for the automatic adjustment of the configuration of the mobile device and/or of the vehicle. That is to say that automatic adjustment of the configuration of the mobile device and/or of the vehicle can also involve the relevant type of wireless communication link being engaged.

On the basis of the configuration data, however, it is also possible to prescribe that only the types of wireless communication link that are currently engaged in the mobile device have the configuration adjusted for them in the mobile device and vehicle. On the basis of the configuration data, it is also possible to prescribe, or it may be the case as standard (even if the configuration data have no information in this regard), that the configuration of the mobile device is reset to the original configuration, which the mobile device had prior to automatic adjustment of the configuration of the mobile device for the wireless communication link to the vehicle, again on leaving the vehicle.

Furthermore, the configuration data can also contain information about a routing table that is used to define the MAC/IP address or (in the case of mobile radio) the APN (Access Point Name) that is used for routing data packets. This information about the routing table may be available per type of the wireless communication link or even per service/function of the respective wireless communication link.

Furthermore, the configuration data for the mobile device and/or the vehicle may contain information concerning the manner in which a particular wireless communication link between the mobile device and the vehicle is intended to be used. By way of example, it is therefore possible to prescribe that a Bluetooth link is intended to be used only in accordance with HFP (Hands Free Profile), that is to say, e.g., only for wireless telephony in the vehicle. For WLAN tethering, it would be possible to prescribe that it can be used only for Internet connections of the mobile device but not for data packets of the vehicle. By way of example, it would also be possible to prescribe that only certain vehicle services (e.g., navigation services) can use WLAN tethering, while this is prohibited for other vehicle services. Furthermore, the configuration data could prescribe that a WLAN link from the mobile device can be used only for an internal data interchange with other WLAN-compatible devices in the vehicle, the vehicle being a type of WLAN access point. In this case, a connection to the Internet for the mobile device by means of WLAN could be prohibited. On the basis of the configuration data, it would further be possible to prescribe that Bluetooth tethering is used for the Internet connection of the vehicle.

By way of example, authentication of the mobile device can comprise the following operations:
  sending of a radio signal from the mobile device to the vehicle. This radio signal may be an NFC signal (near field communication signal) or a keyless entry radio signal. This radio signal can either be produced by the mobile device automatically when the mobile device recognizes that it is close to the vehicle, or it is also possible for this radio signal to be sent by the mobile device when a particular operator control element of the mobile device is operated by an operator (e.g., the driver of the vehicle). This radio signal comprises a piece of information (e.g., certificate) that the vehicle can use to classify the mobile device as an authorized mobile device and that the vehicle can use to recognize the mobile device that it is. Furthermore, the radio signal comprises the instruction that the vehicle needs to be unlocked.
  reception of the radio signal by the vehicle. On the basis of the radio signal, the vehicle recognizes firstly that the radio signal has been sent by a mobile device that is authorized for the vehicle, to unlock the vehicle, and secondly the identity of the mobile device. Following reception of the radio signal by the vehicle, firstly the mobile device is authenticated and secondly the vehicle is automatically unlocked.

The embodiment described above involves the authentication of the mobile device and hence practically also the automatic configuration of mobile device and vehicle being integrated in to the process of unlocking the vehicle using a mobile device.

As already explained above, the radio signal for authenticating the mobile device and for unlocking the vehicle can be generated automatically by the mobile device when the mobile device comes close to the vehicle. In accordance with at least one disclosed embodiment, the radio signal is sent by the mobile device if a further radio signal has been received by the mobile device beforehand. The further radio signal can either be sent periodically by the vehicle, or it can be sent whenever the vehicle senses that an object is approaching the vehicle.

This disclosed embodiment affords the benefit that the driver or user of the mobile device does not need to perform any manual activity to set up the wireless communication link between the mobile device and the vehicle. As soon as the mobile device comes close to the vehicle, the vehicle is automatically unlocked and the configuration of the mobile device and the configuration of the vehicle for the wireless communication link are performed.

The configuration of the mobile device for the wireless communication link to the relevant vehicle, which is performed using an application running on the mobile device, can use data that are stored in the mobile device itself. However, precisely when the communication link is setup to the relevant vehicle for the first time, it is possible for the mobile device to retrieve the data required for the configuration by a further wireless communication link (e.g., mobile radio) from an external server. According to the disclosed embodiments, this possibility of retrieving the configuration data from the server also comprises the embodiment that these data are transmitted (unrequested by the mobile device) from the server to the mobile device and are stored in the mobile device. On retrieval of the data by the mobile device, the mobile device normally also sends a certificate along with this query, from which the server can recognize the authorization of the mobile device and the identity of the mobile device.

Similarly, configuration of the vehicle for the wireless communication link to the respective mobile device can involve the use of data that are stored in the vehicle. In this case too, it is possible, precisely when the communication link is set up to the respective mobile device for the first time, for the vehicle to retrieve the data required for configuration via a further wireless communication link (e.g., mobile radio) from an external server. Instead of the configuration data being retrieved from a server by the vehicle, the data required for configuration can also be transmitted from the server to the vehicle and stored in the vehicle, without this having involved the vehicle having sent a request to the server beforehand. When the data are retrieved by the vehicle, the vehicle normally also sends a certificate along with its query, from which the server can recognize the authorization of the vehicle and the identity of the vehicle.

The use of configuration data stored on a server has the benefit that a central and almost always available memory (i.e., the server) is in place for these configuration data. This means that the configuration data can be stored before the mobile device actually comes within range of the vehicle for the first time. It is even possible for the configuration data to be stored in the server before the mobile device and/or the vehicle is/are transferred to the end customer. Once the vehicle or the mobile device has had the configuration data transmitted to it from the server, the configuration data can be stored on the mobile device or vehicle, so that it is not absolutely necessary for the mobile device or vehicle to be in contact with the server whenever the wireless communication link is set up. Should the configuration data change, however, then the vehicle and/or the mobile device needs to be informed of this change by the server.

The data for the configuration of the mobile device for the wireless communication link to the vehicle and/or the data for the configuration of the vehicle for the wireless communication link to the mobile device are prescribed to set up the wireless communication link automatically as soon as the mobile device has authenticated itself. For this prescribing of the data, there are multiple options, according to the disclosed embodiments:

the personalized settings and configurations can be made via a web portal and stored on the server.

the settings can be made (for example, for an initial setup of the communication link between vehicle and mobile device) with the vehicle (e.g., with the infotainment system of the vehicle). In this case, the vehicle can transmit the settings and configuration data to the server. The mobile device can then fetch the configuration data from the server, or the server makes the configuration data available to the mobile device unrequested.

the settings can be made (for example, for an initial setup of the communication link between vehicle and mobile device) with the mobile device (e.g., with an application of the mobile device). In this case, the mobile device can transmit the settings and configuration data to the server. The vehicle can then fetch the configuration data from the server, or the server makes the configuration data available to the vehicle unrequested.

The mobile device can be authenticated using a radio signal, as described above. However, should the mobile device be incapable of generating this radio signal, there is the option, according to the disclosed embodiments, for the mobile device to be authenticated on the basis of a biometric check (e.g., check on the voice, the fingerprint or another biometric property of the driver or owner of the mobile device) or the basis of an input of a password using a device of the vehicle. This disclosed option can naturally also be used when the mobile device is capable, in principle, of generating the radio signal for the purpose of its authentication.

Effectively as an embodiment of the option described above, an external server can be informed by the vehicle, by a further wireless communication link, that the configuration of the mobile device needs to be performed as soon as the biometric check or the input of the password has been successful. The mobile device can then be contacted by the server by yet a further wireless communication link to inform the mobile device that the configuration of the mobile device for the wireless communication link to the vehicle needs to be performed (e.g., using an appropriate application of the mobile device). If the configuration data required for this purpose are not stored in the mobile device, these configuration data can be transmitted from the server to the mobile device.

The disclosed embodiments also provide a vehicle being provided that comprises control means, unlocking means for unlocking the vehicle and communication means for wireless communication. The vehicle is designed to use the communication means to receive a radio signal from a mobile device. On the basis of the received radio signal, the vehicle is capable of using the control means to authenticate the mobile device. When the mobile device is authenticated, the vehicle activates the unlocking means to unlock the vehicle. Additionally, the vehicle automatically configures its communication means for a wireless communication link to the mobile device.

The benefits of the disclosed vehicle correspond to the benefits of the disclosed method that are explained above in detail, meaning that repetition is dispensed with here.

The disclosed embodiments provide a mobile device that comprises control means and communication means for wireless communication. The communication means capture a radio signal from a vehicle and use the control means to send a further radio signal for unlocking the vehicle to the vehicle as soon as the radio signal has been captured. The control means take the vehicle that is to be unlocked (or take the radio signal from the vehicle) as a basis for configuring its communication means for a wireless communication link to the vehicle.

The benefits of the disclosed mobile device essentially correspond to the benefits of the disclosed method that are explained above in detail, meaning that repetition is dispensed with here.

Finally, the disclosed embodiments provide a system that comprises a vehicle and a mobile device. This system can be augmented by an external server.

Disclosed embodiments are suitable for motor vehicles. It goes without saying that the disclosed embodiments are not restricted to this area of application, since the disclosed embodiments can also be used for ships, airplanes and track-mounted or railborne vehicles. Furthermore, the disclosed embodiments are, in principle, suitable, even in isolation from a vehicle, for setting up a wireless communication link between a mobile device and a fixed communication device in a building, for example.

FIG. 1 schematically shows a vehicle 10, a mobile device 40 and an external server 50. The vehicle 10, for its part, comprises an apparatus 20 that comprises not only a controller 1 but also communication means 3, unlocking means 2, for unlocking doors of the vehicle 10, authentication means 5 and a memory 4, for storing configuration data. The mobile device 40, for its part, comprises not only a controller 7 but also communication means 8 and a memory 9, for storing configuration data. The communication means 3 of the apparatus 20 or of the vehicle 10 and the communication means 8 of the mobile device 40 are designed for wireless communication with one another and, in each case, with the server 50. Furthermore, the FIGURE shows a system 30 that comprises the apparatus 20 of the vehicle 10 and the mobile device 40.

The disclosed embodiments will be explained in detail below.

Effectively as an initial operation, the configuration data for the vehicle 10 (to be more precise for the communication means 3) and for the mobile device 4 (to be more precise for the communication means 8) are produced. The configuration data for the vehicle 10 can then be stored in the memory 4 of the vehicle, and the configuration data for the mobile device 40 can be stored in the memory 9 of the mobile device 40. Alternatively, it is possible for the configuration data to be stored in the server 50.

In the event of the mobile device 40 being designed to unlock the vehicle 10 (i.e., the mobile device 40 has what is known as a mobile key that is authorized for the vehicle 10), the communication means 3 of the vehicle 10 are configured on the basis of the configuration data for one or more wireless communication links 11 between the vehicle 10 and the mobile device 40 as soon as the mobile device 40 sends the signal to unlock the vehicle 10. In this case, the configuration data of the communication means 3 are adjusted by means of an application running in the mobile device 40, which application either sends the signal to unlock the vehicle 10 itself or is started by a further application that sends the signal to unlock to the vehicle 10. If the configuration data are not yet stored in the mobile device 40, they are retrieved from the server 50 by a further wireless communication link 13 beforehand.

As soon as the vehicle captures the signal to unlock from the mobile device 40, the vehicle 10 unlocks its doors and configures its communication means 3 on the basis of the configuration data for the one or more wireless communication link(s) 11 to the mobile device 40. Since the signal sent by the mobile device 40 also contains an identity for the mobile device 40, the vehicle 10 knows the mobile device 40 to which the wireless communication link 11 needs to be set up, and can configure its communication means 3 using the relevant configuration data. If the configuration data are not yet stored in the vehicle 10, they are retrieved from the server 50 via a further wireless communication link 12 beforehand.

In this disclosed embodiment, the wireless communication link 11 between the vehicle 10 and the mobile device 40 can be set up without any input by the driver or user of the mobile device 40.

In the event that the mobile device 40 is not designed to unlock the vehicle 10 (or this function cannot be activated for whatever reasons), the driver or user of the mobile device 40 unlocks the vehicle 10 in the standard manner. Subsequently, the driver or user of the mobile device 40 authenticates himself using the authentication apparatus 5 within the vehicle 10, as a result of which the mobile device 40 is also authenticated. This authentication can be effected by means of the input of a password or the checking of a biometric property of the driver or user of the mobile device 40 by means of the authentication apparatus 5, for example.

Following successful authentication, the vehicle 10 knows the mobile device 40 to which a wireless communication link needs to be set up. Therefore, the vehicle 10 configures its communication means 3 using the configuration data associated with this mobile device 40. Furthermore, the vehicle 10 uses the further wireless communication link 12 to inform the server 50 of the mobile device 40 to which the vehicle 10 wishes to set up a wireless communication link 11. The server 50 then uses the communication link 13 to inform the mobile device 40, whereupon the mobile device 40 configures its communication means 8 on the basis of the configuration data, particularly, by means of an application.

In the case of this embodiment too, apart from the authentication, no further input by the driver or user of the mobile device 40 is necessary to set up the wireless communication link 11 between the vehicle 10 and the mobile device 40.

LIST OF REFERENCE SYMBOLS

1, 7 Controller
2, Unlocking means
3, 8 Communication means
4, 9 Memory
5 Authentication means
10 Vehicle
11-13 Wireless communication link
20 Apparatus
30 System
40 Mobile device
50 Server

The invention claimed is:

1. A method for setting up a wireless communication link between a mobile communication device and a specific transportation vehicle, the method comprising:
   authentication of the mobile communication device to determine whether the mobile communication device is pre-authorized to set up wireless communication with the specific transportation vehicle;
   automatic adjustment of a configuration of the mobile communication device for the wireless communication link in response to and based on the mobile communication device authentication determining that the mobile communication device is pre-authorized to set up wireless communication with the specific transportation vehicle;
   automatic adjustment of a configuration of the transportation vehicle for the wireless communication link in response to and based on the mobile communication device authentication determining that the mobile communication device is pre-authorized to set up wireless communication with the specific transportation vehicle;
   informing an external server by the transportation vehicle, via a further wireless communication link, that the configuration of the pre-authorized mobile communication device requires adjustment for the wireless communication link; and
   the external server contacts the pre-authorized mobile communication device, via yet a further wireless communication link, to perform adjustment of the configuration of the pre-authorized mobile communication device automatically for the wireless communication link between the mobile communication device and the transportation vehicle.

2. The method of claim 1, wherein the authentication of the mobile communication device as pre-authorized comprises:
   sending of a radio signal from the mobile communication device; and
   receiving the radio signal by the transportation vehicle, and
   wherein the radio signal is a basis for both authenticating the mobile communication device as pre-authorized and automatically unlocking the vehicle in response to such authentication of the pre-authorized mobile communication device.

3. The method of claim 2, further comprising sending a further radio signal from the transportation vehicle to the pre-authorized mobile communication device, wherein the radio signal sent by the pre-authorized mobile communication device is sent in response to the further radio signal having been received by the pre-authorized mobile communication device from the transportation vehicle.

4. The method of claim 1, further comprising the pre-authorized mobile communication device retrieving data for the configuration of the pre-authorized mobile communication device for the wireless communication link via a further wireless communication link from an external server.

5. The method of claim 1, further comprising the transportation vehicle retrieving data for the configuration of the transportation vehicle for the wireless communication link via a further wireless communication link from an external server.

6. The method of claim 1, further comprising prescribing data for the configuration of the mobile communication device and/or of the transportation vehicle, wherein the data includes personalized settings and configuration data accessible from an external server made via a web portal and stored on the server.

7. The method of claim 1, wherein the authentication of the pre-authorized mobile communication device comprises a check of a biometric property or an input of a password by a device installed in the transportation vehicle.

8. A transportation vehicle comprising:
a controller; and
communication means for wireless communication with a mobile communication device,
wherein the vehicle controller is configured to receive a radio signal from the mobile communication device, and based on the received radio signal, authenticate whether the mobile communication device is pre-authorized to set up wireless communication with the transportation vehicle,
wherein the vehicle controller is configured to control locking of the transportation vehicle based on the received radio signal, and
wherein the vehicle controller is configured to automatically configure the communication means to establish a wireless communication link to the mobile communication device in response to and based on authentication of the mobile communication device determining that the mobile communication device is pre-authorized to set up wireless communication with the transportation vehicle,
wherein an external server is informed by the transportation vehicle, via a further wireless communication link, that the configuration of the mobile communication device requires adjustment, and wherein the mobile communication device is contacted by the server, via yet a further wireless communication link, to perform adjustment of the configuration of the mobile communication device automatically for the wireless communication link between the mobile communication device and the transportation vehicle.

9. The transportation vehicle of claim 8, wherein the authentication of the mobile device comprises:
sending of a radio signal from the mobile communication device; and
receiving the radio signal by the transportation vehicle,
wherein the radio signal is the basis for both authenticating the mobile communication device as pre-authorized to set up wireless communication with the transportation vehicle and automatically unlocking the vehicle using the pre-authorized mobile communication device.

10. The transportation vehicle of claim 9, wherein the radio signal is sent by the mobile communication device in response to a further radio signal having been received by the mobile communication device beforehand, the further radio signal having been sent by the transportation vehicle.

11. The transportation vehicle of claim 8, wherein the mobile communication device retrieves data for the configuration of the mobile communication device for the wireless communication link via a further wireless communication link from an external server.

12. The transportation vehicle of claim 8, wherein the transportation vehicle retrieves data for the configuration of the transportation vehicle for the wireless communication link via a further wireless communication link from an external server.

13. The transportation vehicle of claim 8, wherein the authentication of the mobile communication device as being pre-authorized set up wireless communication with the transportation vehicle comprises a check of a biometric property or an input of a password by a device installed in the transportation vehicle.

14. A mobile communication device comprising:
a controller; and
communication means for wireless communication,
wherein the communication means capture a radio signal from a transportation vehicle,
wherein the controller uses the captured radio signal as a basis for sending a further radio signal for unlocking the transportation vehicle to the transportation vehicle, wherein the controller configures the communication means for a wireless communication link to the transportation vehicle in response to determining that the mobile communication device is pre-authorized to set up wireless communication with the transportation vehicle,
wherein an external server is informed by the transportation vehicle, via a further wireless communication link, that the configuration of the mobile communication device needs to be adjusted, and
wherein the mobile communication device is contacted by the server, via yet a further wireless communication link, to perform adjustment of the configuration of the mobile communication device automatically for the wireless communication link between the mobile communication device and the transportation vehicle.

15. The mobile communication device of claim 14, wherein the vehicle performs authentication determining that the mobile communication device is pre-authorized to set up wireless communication with the transportation vehicle, automatic adjustment of a configuration of the pre-authorized mobile communication device for the wireless communication link in response to and based on the authentication determining that the mobile communication device is pre-authorized to set up wireless communication with the transportation vehicle, and automatic adjustment of a configuration of the transportation vehicle for the wireless communication link in response to and based on the authentication determining that the mobile communication device is pre-authorized to set up wireless communication with the transportation vehicle, wherein the authentication of the mobile communication device comprises sending of a radio signal from the mobile communication device, and wherein following receipt of the radio signal by the transportation vehicle, the radio signal is the basis for both authenticating the mobile communication device as pre-authorized to set up wireless communication with the transportation vehicle and automatically unlocking the transportation vehicle.

16. The mobile communication device of claim 15, wherein the radio signal is sent by the mobile communication device in response to a further radio signal having been received by the mobile communication device beforehand, the further radio signal having been sent by the transportation vehicle.

17. The mobile communication device of claim 14, wherein the mobile communication device retrieves data for the configuration of the mobile communication device for the wireless communication link via a further wireless communication link from an external server.

18. The mobile communication device of claim 14, wherein the transportation vehicle retrieves data for the configuration of the transportation vehicle for the wireless communication link via a further wireless communication link from an external server.

19. The mobile communication device of claim 14, wherein the authentication of the mobile communication device comprises a check of a biometric property or an input of a password by a device of the transportation vehicle.

* * * * *